H. E. DERBYSHIRE.
CYLINDER FOR ENGINES.
APPLICATION FILED OCT. 18, 1913.
1,094,199.
Patented Apr. 21, 1914.
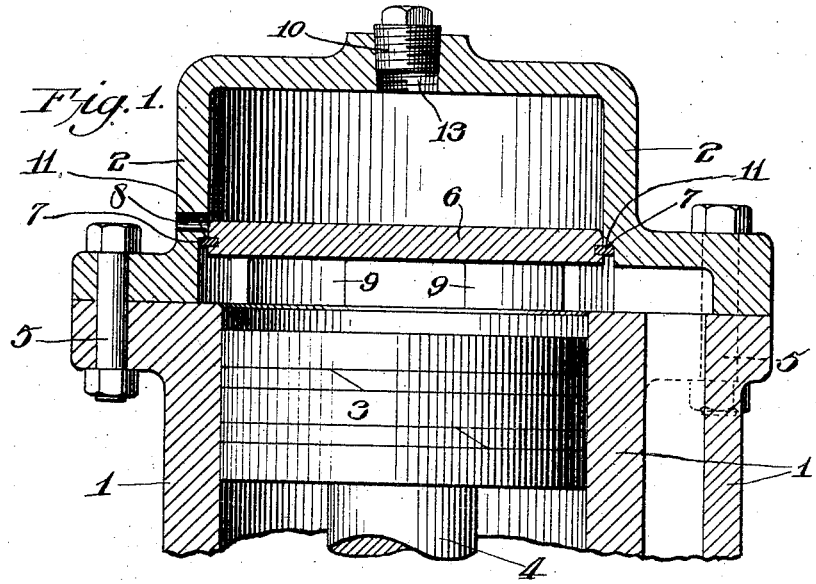
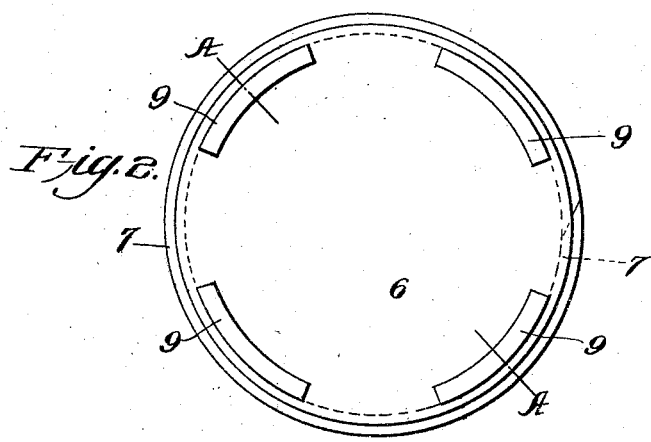
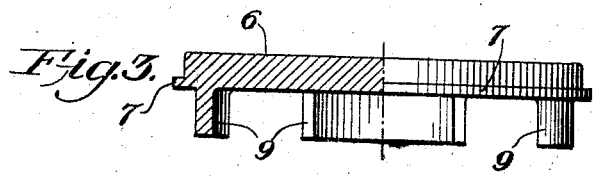
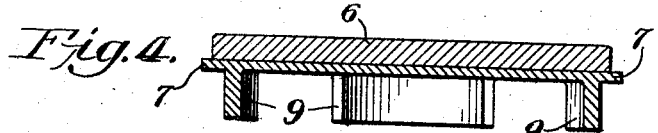
WITNESSES:
INVENTOR
Henry E. Derbyshire
BY
Chas A. Cutter
ATTORNEY,

UNITED STATES PATENT OFFICE.

HENRY E. DERBYSHIRE, OF CHAMBERSBURG, PENNSYLVANIA, ASSIGNOR TO CHAMBERSBURG ENGINEERING COMPANY, OF CHAMBERSBURG, PENNSYLVANIA, A CORPORATION OF PENNSYLVANIA.

CYLINDER FOR ENGINES.

1,094,199.        Specification of Letters Patent.      Patented Apr. 21, 1914.

Application filed October 18, 1913. Serial No. 795,845.

*To all whom it may concern:*

Be it known that I, HENRY E. DERBYSHIRE, a citizen of the United States, and a resident of Chambersburg, in the county of Franklin and State of Pennsylvania, have invented certain new and useful Improvements in Cylinders for Engines, of which the following is a specification.

My invention relates to improvements in cylinders for steam or air engines and the object of my invention is to furnish a means for preventing injury to parts of the main cylinder, or to life or property, should its piston rod break, be pulled out of a ram, or be otherwise disconnected when steam or air is under the piston.

My invention is particularly applicable to the cylinder of a steam hammer in which, owing to the nature of its use, the piston rod presently crystallizes and is apt to break, the break usually being at a point near its connection to the ram. Should a break occur while there is steam under the piston, or should steam be admitted to the lower side of the piston after the breaking of the rod, the piston will be driven upward under a full head of steam and will not infrequently break the head of the cylinder and pass completely out of it. If the cylinder head and the bolts which secure it to the cylinder be strong enough to arrest the flying piston the cylinder itself would probably be ruptured, the final result being quite as serious as if the head only was torn off.

My invention is illustrated in the accompanying drawings which form part of this specification, in which similar numerals of reference indicate similar parts throughout the several views, and in which, Figure 1, is a central sectional elevation of a cylinder fitted with my improvements; Fig. 2, a plan of the under side of one form of safety piston; Fig. 3, on the left hand side, a section of one half of Fig. 2 on line A—A and on the right hand side a side elevation of Fig. 2; Fig. 4, a central sectional view of a modified form of auxiliary head and piston.

1 is a steam cylinder, 2 the cylinder cover, 3 the piston and 4 the piston rod which, if the invention be applied to a steam hammer, is connected to the ram in the usual manner. 5 are bolts for connecting cover 2 and cylinder 1.

As my invention relates particularly to the arrangement and construction of the cylinder I do not deem it necessary to illustrate the parts of a machine of which it may form one, it being understood that while the invention is particularly designed for use in connection with the cylinder of a steam hammer it may be equally well used in connection with any cylinder the piston rod of which is liable to break, become disconnected, or otherwise released, and driven violently toward the cylinder head.

The cover 2, which is bolted to cylinder 1, forms the cylinder of a dash pot the piston of which, preferably, carries a shearing ring 7 which, with an annular shoulder 11 inside and near the lower end of its cylinder, forms a steam tight head for the main cylinder. The shearing ring 7 is sufficiently strong to withstand all ordinary steam pressures but is adapted, should the end of the main piston suddenly engage it, to shear off and release the piston 6 which will be driven up in its cylinder compressing the air therein and acting as a break to bring the main piston to rest before any injury is done to the main cylinder or its cover 2. The engagement of the main piston and the piston of the dash pot can only occur when the main piston rod is released by breakage or otherwise.

In Fig. 1 the shearing ring 7 is separate from the piston 6, the latter being furnished with a groove to hold the former. The outer part of the ring 7 is held by shoulder 11 formed on the inner side of the cover 2. The ring may be constructed of fiber, lead, or any other suitable material, it may form an integral part of the casting of piston 6, or it may be simply the periphery of a disk placed below piston 6 as shown in Fig. 4. As I have before stated the shearing ring or flange 7 makes a steam tight joint between the piston 6 and the cover 2, should any leak develop the condensed steam will be drawn out of the cylinder formed in case 2 by the drip pipe 8.

Upon its under side the piston 6 is preferably furnished with legs 9 which rest upon the top of the cylinder 1 and as the piston 6 is thus supported upon its under side and as the shoulder 11 in the cover 2 bears against the top of the ring or flange 7 the piston 6 is so firmly held that it cannot be dislodged by any ordinary service or jarring. Under ordinary conditions the piston 3 never touches the piston 6. The steam enters the clearance space over piston 3 and the space between the legs 9 and the bottom of piston 6.

If the shearing ring be a separate piece from the piston 6, as shown in Figs. 1 and 4, it can be quickly replaced after having been sheared off by the main piston striking the piston 6, if, however, it form an integral part of piston 6 the usefulness of both piston and ring is destroyed when the latter is broken. Should the piston 6 jam in its cylinder after the shearing of ring 7 it can be easily dislodged with a rod or bar introduced into cap 2 through hole 13 which is ordinarily closed by a plug 10.

Having thus described my invention I claim as new and desire to secure by Letters Patent:

1. The combination with a cylinder and its piston, of a dash pot forming a continuation of the upper end of said cylinder and furnished within with an annular shoulder, and a means held against upward pressure by said shoulder and breakable upon contact with said main piston, for normally forming a head for said main cylinder.

2. In combination, a main cylinder and piston, a cover, forming an auxiliary cylinder, secured to said main cylinder and furnished within with an annular shoulder, a piston within said auxiliary cylinder, and a shearable means held against upward pressure by said shoulder and forming in connection with said latter piston a head for said main cylinder.

3. In combination, a main cylinder and piston, a cover secured to and forming a continuation of said main cylinder, a piston within said cover forming a head for said main cylinder, and a breakable means uniting in a steam tight manner said latter piston and the cover, said breakable means being adapted to be fractured to release said latter piston when struck by said main piston.

4. In combination, a main cylinder and piston, a cover forming an auxiliary cylinder secured to said main cylinder, a piston in said auxiliary cylinder, and a shearing ring or flange carried by or forming part of said latter piston and forming in connection therewith a steam tight head for said main cylinder.

5. In combination, a main cylinder and piston, a cover forming an auxiliary cylinder and furnished interiorly with an annular shoulder, means for removably securing said auxiliary to said main cylinder, a piston within said auxiliary cylinder carrying a shearable means adapted to form a steam tight joint with the shoulder in the auxiliary cylinder and with legs adapted to rest on top of said main cylinder.

HENRY E. DERBYSHIRE

Witnesses:
A. A. LONGAKER,
LILLIAN M. WOLF.

Copies of this patent may be obtained for five cents each, by addressing the "Commissioner of Patents, Washington, D. C."